March 9, 1948.  S. E. MILLER  2,437,268
INTERMITTENTLY OPERATING AUTOMATIC FREQUENCY CONTROL
Filed Oct. 11, 1944
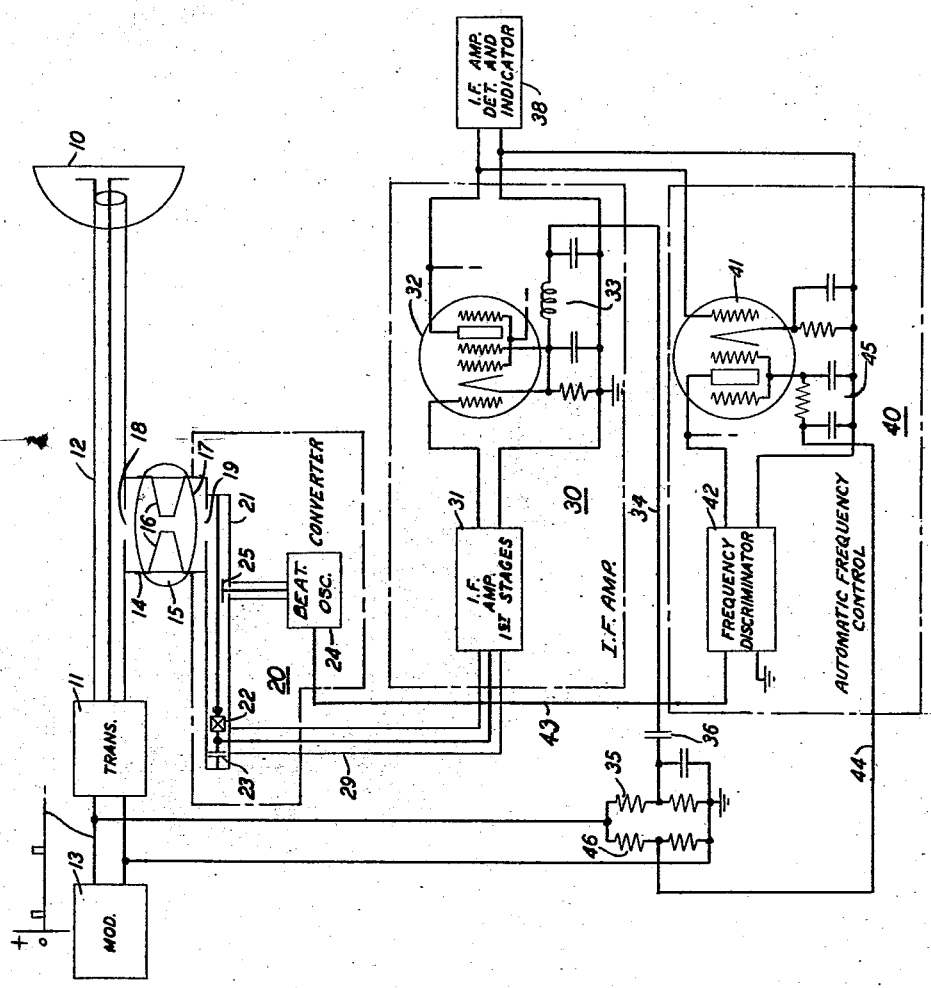
INVENTOR
S. E. MILLER
BY
ATTORNEY Patented Mar. 9, 1948

2,437,268

UNITED STATES PATENT OFFICE 2,437,268

INTERMITTENTLY OPERATING AUTOMATIC FREQUENCY CONTROL

Stewart E. Miller, Jackson Heights, N. Y., assignor to Bell Telephone Laboratories, Incorporated, New York, N. Y., a corporation of New York Application October 11, 1944, Serial No. 558,249

9 Claims. (Cl. 250—13)

This invention relates to automatic frequency control for radio receivers of the radar or other pulse reflection type systems.

In one type of radio object location or radar system pulses of high frequency radiations are transmitted and the resultant reflections from the objects under scrutiny received and observed. By the use of directional transmitting and receiving systems the angular location of the target may be determined and by means of systems for timing the transmitted and reflected pulses the distance to the target can be ascertained. It is often found advantageous in such equipment to employ a single antenna system for both transmitting and receiving. When this is done some duplexing system for protecting the receiver from the effects of the high energy transmitted pulses is desired. One method of accomplishing this result which has been found highly satisfactory is by the use in the path to the receiver of a device resonant at the transmitted radio frequency and shunted by a gas discharge gap. The high energy of the transmitted pulse will break down this gap and effectively short-circuit the path to the receiver for such oscillations while the low energy reflected pulses will not affect the gap and will pass unattenuated to the receiver.

It has also been found desirable to use automatic frequency control of the receiver beating oscillation in such systems. This is particularly true when they are operated at very high frequencies where the frequency stability of both the transmitter and receiver oscillators may not be of a very high order. For various reasons including that of avoiding interference from both friendly systems of the same type and from deliberate enemy attempts at jamming it has been found desirable to operate this automatic frequency control from the transmitted pulses rather than from received signals. In other words the receiver is automatically tuned to the frequency of the transmitted pulses and so has a maximum response to reflections thereof. Two preferred systems have been used for this purpose. In the first, part of the high frequency energy of the pulse is taken directly from the transmitter independent of the normal signal path to the receiver. In the second, the energy leaking through the gas tube duplexing unit described above is used for this purpose. With this second type of system the automatic frequency control system is rendered inoperative except during the periods of the transmitted pulse so that it is not operated by received signals but only by the oscillations from its own transmitter.

The first system has the limitation that it requires radio frequency circuits including a first detector which substantially duplicates the radio frequency circuits of the normal receiver path but are additional thereto. The second system does not have such a limitation as the automatic frequency control circuit is branched off the normal receiver circuit at the intermediate frequency level. However, with this second system difficulties are sometimes encountered as a result of the fact that the gas tube duplexing unit requires a finite time to come into operation. Accordingly, the receiver circuit may be subjected to a spurt of high energy oscillations during the beginning of a transmitted pulse. The effect of this in both the duplexing unit and the receiver circuit may be to produce spurious frequencies and consequently instability or false operation of the automatic frequency control in so far as the normal transmitter frequency is concerned.

An object of this invention is to improve the operation of automatic frequency control for radar systems.

A further object of the invention is to eliminate the effects of initial high energy leakage through the duplexing unit of radio pulsing systems.

In accordance with a feature of this invention a control voltage is supplied to the radio receiver circuit to block it during the initial portion of the transmitted pulse. This renders the receiver inoperative until the discharge gap of the duplexing unit has had time to break down, after which the attenuation produced by the discharge is sufficient to keep the amplitude of the pulse from the transmitter to the receiver low enough to give normal operation of the automatic frequency control system.

In a specific preferred embodiment this invention comprises a radar system employing a transmitter and a receiver operated from the same antenna with a duplexing unit having a gas discharge gap that is broken down by the energy of the transmitted pulse to produce a high attenuation in the input to the receiver. An automatic frequency control for the beating oscillator of the receiver is included in the receiver circuit but is made inoperative except during the time that pulses are transmitted so that the receiver will be tuned for maximum reception at the frequency of the transmitted pulses. A control pulse is produced by differentiating the modulating pulse applied to the transmitter and this is used to block the radio receiver circuit during the initial portion of the transmitted pulse.

These and other objects, features and aspects of the invention may be better understood by reference to the following detailed description of the specific embodiment shown in the schematic circuit diagrams of the drawing.

In this radar system recurrent pulses of ultra-high frequency radio waves are transmitted from a directional antenna 10. During the periods between transmitted pulses the reflections from objects under scrutiny are received in the same antenna. By the observation of detected pulses, for example, on the screen of a cathode ray oscilloscope (not shown) the distance to the reflecting object may be determined and when coordinated with the orientation of the antenna the direction thereof can also be ascertained as is well understood in the art.

The ultra-high frequency radio waves are generated by a transmitter 11 which is coupled to the antenna 10 by a coaxial transmission line 12. (When operating at higher frequencies a wave guide may be used in place of the coaxial line 12.) The operation of the transmitter 11 is controlled by a modulator 13 that produces positive direct current pulses of the required length and recurrence rate. The general nature of these pulses is indicated by the curve that appears in the drawing immediately above the modulator 13 and in which voltage is plotted against time. These direct current pulses are impressed on the transmitter 11 and cause the production of ultra-high frequency radio waves during each pulse.

A radio receiver is coupled to the coaxial line 12 through the duplexing unit. The duplexing unit comprises a resonant cavity 14 tuned to the frequency of the radio oscillations produced by the transmitter 11 with a gas discharge device 15 mounted therein. The gas discharge tube 15 comprises two electrodes 16 connected to the walls of the cavity 14 and enclosed in a partially evacuated vessel 17. The cavity 14 is coupled to the coaxial line 12 by means of an aperture 18 in the common wall of the outer conductor of the line 12 and the cavity. A second aperture 19 in the opposite wall of the cavity provides coupling to the radio receiver.

During the transmission of pulses of radio waves by the transmitter 11 a voltage sufficiently high to break down the gap between the electrodes 16 is developed in the resonant cavity 14. As a result the path from the coaxial line 12 to the radio receiver has a very low impedance shunt and a high attenuation is introduced into the input to the receiver. In the absence of transmitted pulses the voltage is sufficiently low that the gap is not broken down and any waves received in the antenna 10 are transmitted to the receiver with practically no attenuation. The operation and detailed construction of such a duplexing unit is described in fuller detail in the patent applications of H. T. Friis, Serial No. 474,164, filed January 30, 1943, and A. L. Samuel, Serial No. 474,122, filed January 30, 1943.

The radio receiver comprises a converter 20 the intermediate frequency output of which is coupled through a coaxial line 29 to a preliminary intermediate frequency amplifier 30. The output of the intermediate frequency amplifier 30 is branched between the final intermediate frequency amplifier, detector and indicator circuit 38 and an automatic frequency control circuit 40.

The converter 20 employs a tuned coaxial input line 21 which is coupled at one end to the resonant cavity 14 by means of the aperture 19. At the other end of the line 21 there is provided a crystal detector or modulator 22 connected to outer conductor of the line 21 through a radio frequency by-pass capacitor 23 and to the inner conductor by means of the usual contact point. Heterodyning oscillations generated in the beating oscillator 24 are introduced by means of the capacitor coupling plate 25. The intermediate frequency output of the converter is taken off across the capacitor 23 by means of the coaxial line 29.

The preliminary intermediate frequency amplifier 30 comprises one or more initial stages 31 and a subsequent stage employing a vacuum tube amplifier 32. This stage is conventional except that provisions are made for supplying a blocking bias between the cathode and control grid through the low-pass filter 33. A voltage for blocking the amplifier tube 32 during the initial portion of transmitted pulses is supplied through the connection 34 as will be later described.

The output of the amplifier 32 is divided between two branches. In the branch 38 the signal is further amplified at the intermediate frequency level, detected, amplified at the signal or video level and impressed on the indicator. The automatic frequency control circuit 40 is connected in the other branch.

The automatic frequency control circuit comprises a gating amplifier tube 41 and a frequency discriminator circuit 42. Obviously additional intermediate frequency amplifier stages may be used ahead of the discriminator or direct current amplifier stages may be employed in the discriminator output or both as required by circuit conditions. As is well understood in the art, the frequency discriminator 42 with its associated integrating circuit responds to the intermediate frequency input to produce a direct current output depending in amplitude and polarity upon the frequency of the input. When this frequency is of the correct value there is no direct current output and as the frequency varies from the desired value the output voltage also varies being of opposite signs for frequencies above and below the required value. This direct current output is supplied through the connection 43 to the beating oscillator 24 to regulate the frequency of the oscillations produced thereby, for example, by the control of the voltage of the repeller electrode of a velocity-modulation oscillator of the reflection type.

The amplifier 41 is normally blocked by reason of the fact that no bias voltage is supplied to its screen grid. However, during the transmission of pulses amplifier 41 is rendered operative by virtue of a positive direct current voltage applied to its screen grid through the connection 44 and the resistance-capacity filter 45. This voltage is obtained from the voltage divider 46 connected across the output of the modulator 13. In this way the automatic frequency control circuit 40 is rendered operative during the period of transmission of pulses and tunes the beating oscillator 24 to make the receiver selective to signals of the frequency of the transmitted pulses. The time constant of the output circuit of the discriminator 42 is such that this regulation of the beating oscillator 24 is maintained throughout the period between pulses.

A second voltage divider 35 is connected across the output of the modulator 13. The low voltage tap on the voltage divider 35 is connected through the capacitor 36 to the lead 34 to the cathode of the tube 32. As a result of the differentiating action of the capacitor 36 a short pulse is produced during the initial portion of each transmitted pulse. This short pulse is applied through the connection 34 and the filter 33 upon the cathode of the tube 32 making the cathode sufficiently positive with respect to the grid to block the tube 32. As a result of this action the subsequent stages of the receiver and particularly the automatic frequency control circuit 40 are rendered unresponsive to receiver inputs during this initial period of each transmitted pulse. The gap of the discharge tube 15 will have sufficient time to break down during this period and during the remainder of the transmitted pulse the broken down gap will produce a high attenuation of the input to the receiver. As a result the oscillatory energy to the receiver will be at a sufficiently low level to cause normal operation of the automatic volume control circuit 40 without such spurious effects and false responses as might be produced by the high energy input that otherwise occur during the initial period of the pulse before the discharge between the electrodes 16 has taken place.

The embodiment of the drawing is shown as illustrative of the application of the invention and is designed to meet certain operating and circuit conditions and obviously is susceptible of various modifications without departing from the invention. I wish to be understood that I do not desire to be limited to the exact details of construction shown and described for obvious modifications will occur to a person skilled in the art. For example: other conditions might make it desirable to apply the blocking bias to the first intermediate frequency amplifier stage instead of a later stage such as tube 32. Similarly, both the blocking bias for the tube 32 and the gating bias for the tube 41 might under certain conditions be applied to electrodes other than those used in this circuit with similar or more favorable results.

What is claimed is:

1. In a pulse transmitting and receiving system employing a duplexing unit operated by the transmitted pulses to reduce the input to the receiver during transmission, means for producing a control pulse at the beginning of the transmitted pulse and of shorter duration, means responsive to said control pulses for blocking the receiver, a normally inoperative automatic frequency control responsive to the receiver output, and means for rendering said automatic frequency control operative during each transmitted pulse.

2. In a pulse transmitting and receiving system employing a duplexing unit including a discharge gap broken down by the high voltage of the transmitted pulses to reduce the input to the receiver during transmission, means for producing a control pulse at the beginning of each transmitted pulse and of shorter duration, means responsive to said control pulses for blocking the receiver, a normally inoperative automatic frequency control responsive to the receiver output, and means for rendering said automatic frequency control operative during each transmitted pulse.

3. In a pulse reflection system, a transmitter for producing recurrent pulses of radio frequency oscillations, a radio receiver comprising a beating oscillator, a first detector for combining the radio input to said receiver with the output of said oscillator and an intermediate frequency amplifier for amplifying the output of said first detector, an antenna, connections from said antenna to the output of said transmitter and the input to said receiver, duplexing means included in said connections and operated by the output of said transmitter for producing a high attenuation in the input to said receiver, an automatic frequency control for said beating oscillator responsive to the output of said intermediate frequency amplifier and normally inoperative, means for rendering said automatic frequency control operative during the transmission of pulses by said transmitter, means for generating a control pulse beginning at substantially the same time as each of said recurrent pulses and of shorter duration, and means for applying said control pulse to said intermediate frequency amplifier to block its transmission.

4. In a pulse reflection system, a transmitter for producing recurrent pulses of radio frequency oscillations, a radio receiver comprising a beating oscillator, a first detector for combining the radio input to said receiver with the output of said oscillator and an intermediate frequency amplifier for amplifying the output of said detector, an antenna, connections from said antenna to the output of said transmitter and the input to said receiver, duplexing means included in said connections and comprising a discharge gap broken down by the high voltage developed thereacross during the transmission of pulses by said transmitter to introduce a high attenuation in the input connections to said receiver, an automatic frequency control for said beating oscillator responsive to the output of said intermediate frequency amplifier and normally inoperative, means for rendering said automatic frequency control operative during the transmission of said recurrent pulses, means for generating a control pulse beginning at substantially the same time as each of said recurrent pulses but of shorter duration, and means responsive to said control pulse for blocking said intermediate frequency amplifier.

5. A system according to claim 3 in which said intermediate frequency amplifier comprising a vacuum tube having a cathode and a control electrode, and in which said last-mentioned means comprises connections for applying said control pulse between said cathode and said control grid.

6. In a pulse reflection system, an ultra-high frequency radio transmitting oscillator, a generator of recurrent signal pulses, connections for supplying said pulses to said transmitting oscillator to cause the production of oscillations during each of said signal pulses, a radio receiver comprising a beating oscillator, a first detector for combining the radio input to said receiver with the output of said beating oscillator, an intermediate frequency amplifier for amplifying the output of said detector, an automatic frequency control system responsive to the output of said intermediate frequency amplifier for regulating said beating oscillator and normally inoperative, means responsive to said signal pulses for rendering said automatic frequency control operative during each said signal pulse, an antenna, connections from said antenna to the output of said transmitting oscillator and to the input to said radio receiver, a duplexing unit responsive to outputs from said transmitting oscillator for producing a high attenuation in the input to said radio receiver, a differentiating circuit having an input connected to said generator of recurrent signal pulses to produce control pulses of a shorter length than said signal pulses beginning at the same time as said signal pulses, and connections for supplying said control pulses to said intermediate frequency amplifier to block its transmission.

7. In a pulse reflection system a radio transmitting oscillator, a generator of recurrent signal pulses, means for modulating said oscillator by said signal pulses to cause the transmission of radio waves during each signal pulse, a radio receiver comprising a beating oscillator, a first detector for combining the radio input to said receiver with the output of said beating oscillator and an intermediate frequency amplifier for amplifying the output of said first detector, an antenna, connections from said antenna to the output of said transmitting oscillator and to the input to said radio receiver, a duplexing unit included in said connections and comprising a discharge gap responsive to the high voltage produced by the output of said transmitting oscillator to produce a high attenuation in the input to said receiver, a normally inoperative automatic frequency control system having an input connected to the output of said intermediate frequency amplifier and an output connected to said beating oscillator, means responsive to said signal pulses for rendering said automatic frequency control system operative to regulate said beating oscillator in response to the output of said intermediate frequency amplifier, a differentiating circuit having an input connected to said signal generator to produce control pulses of shorter duration than said signal pulses beginning at the same time as said signal pulses, and connections for supplying said control pulses to said intermediate frequency amplifier to block its transmission.

8. In a pulse reflection system, a transmitter for producing recurrent pulses of radio frequency oscillations, a radio receiver comprising a beating oscillator, a first detector for combining the output of said beating oscillator with the radio input to said receiver and an intermediate frequency amplifier for amplifying the output of said first detector, an antenna, connections from said antenna to the output of said transmitter and to the input to said radio receiver, a duplexing unit included in said connections and comprising a discharge gap responsive to the output of said transmitter for producing a high attenuation in the input to said radio receiver, means for producing control pulses of shorter length than said recurrent pulses beginning at the same time as each of said recurrent pulses, and connections for supplying said control pulses to said intermediate frequency amplifier to block its transmission.

9. In a pulse reflection system, a radio transmitting oscillator, a generator of recurrent signal pulses, means for modulating said transmitting oscillator by said signal pulses to cause the transmission of radio waves during each signal pulse, a radio receiver comprising a beating oscillator, a first detector for combining the radio input to said receiver with the output of said beating oscillator and an intermediate frequency amplifier for amplifying the output of said first detector, an antenna, connections for said antenna to the output of said transmitting oscillator and to the input to said radio receiver, a duplexing unit included in said connections and comprising a discharge gap responsive to the output of said transmitting oscillator to produce a high attenuation in the input to said radio receiver, a differentiating circuit having an input connected to said generator of recurrent signal pulses to produce control pulses of shorter duration than said signal pulses and beginning at the same instant, and means for supplying said control pulses to said intermediate frequency amplifier to block its transmission.

STEWART E. MILLER.

REFERENCES CITED

The following references are of record in the file of this patent:

UNITED STATES PATENTS

| Number | Name | Date |
|---|---|---|
| 2,363,583 | Gilman | Nov. 28, 1944 |
| 2,284,266 | Bellescize | May 26, 1942 |
| 2,226,459 | Bingley | Dec. 24, 1940 |